June 5, 1962 K. J. BRADY ETAL 3,037,674
METERING DEVICE
Filed Feb. 4, 1959 3 Sheets-Sheet 2

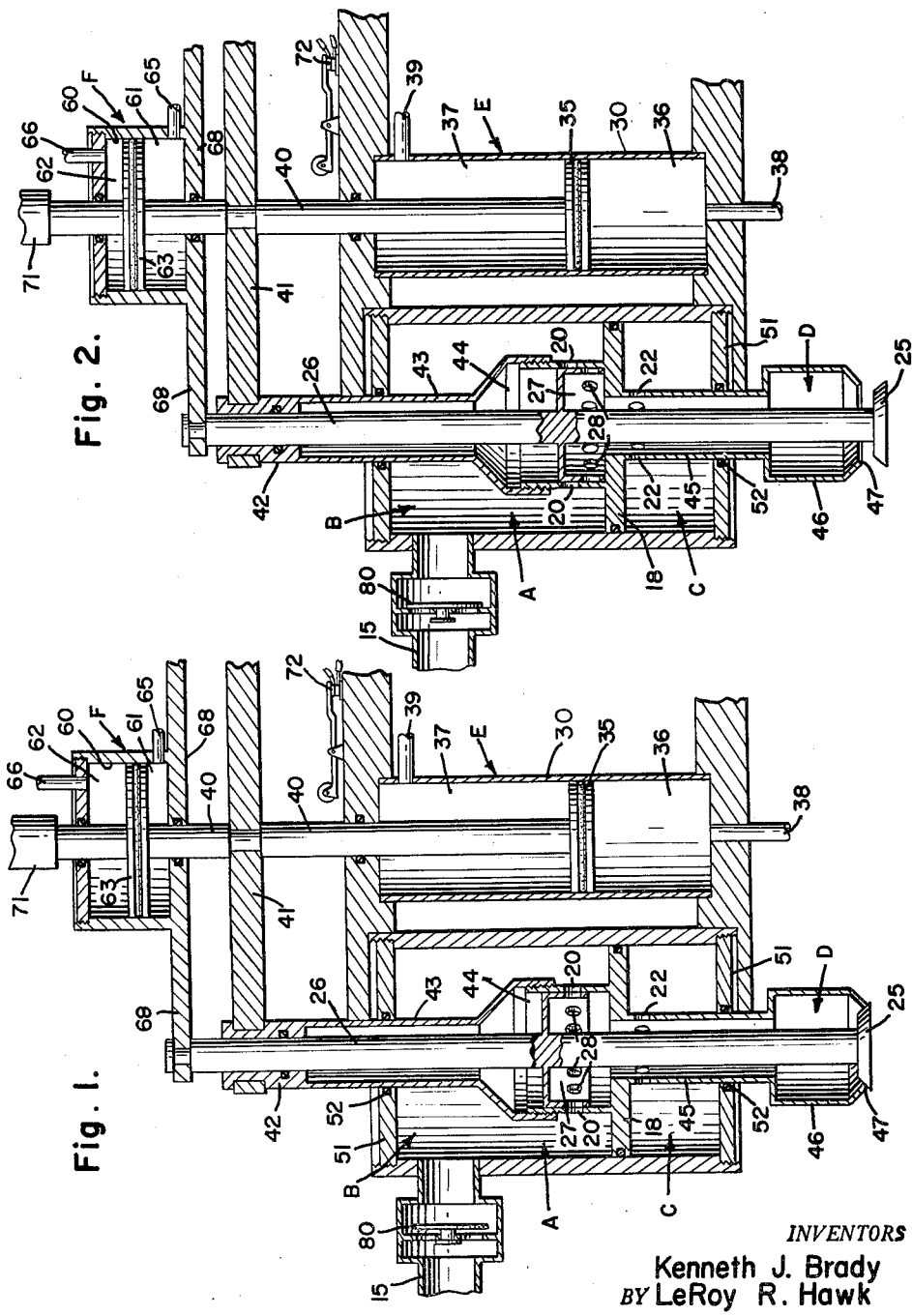

INVENTORS
Kenneth J. Brady
BY LeRoy R. Hawk
Townsend and Townsend
attorneys

United States Patent Office 3,037,674
Patented June 5, 1962

3,037,674
METERING DEVICE
Kenneth J. Brady and Le Roy R. Hawk, Hayward, Calif., assignors to Eggo Food Products, Inc., San Jose, Calif., a corporation of California
Filed Feb. 4, 1959, Ser. No. 791,072
8 Claims. (Cl. 222—319)

This invention relates to a device for rapidly metering a predetermined quantity of batter or other viscous flowable material.

In the automatic food processing of such products as hotcakes, waffles, cookies, miscellaneous bakery items and the like it is necessary to meter a predetermined quantity of batter which feeds the griddle, it is particularly important that the metering be rapid and accurate in quantity where the metering apparatus is to be used with a conveyor or other sequential feeding apparatus.

The metering device is described herein with particular reference to batter. However it is to be understood that any other flowable material may be metered and dispensed with the device of our invention.

A principal object of this invention is to provide a batter feeding or metering device which will dispense a precise quantity of batter upon demand.

A feature and advantage of this invention is that the recharging time between discharges of batter is sufficiently short to allow rapid batter feed.

Another object of this invention is to provide a novel batter metering apparatus employing batter under pressure which functions as the primary force for the dispensing system.

Another feature and advantage of this invention is that the batter pressure is utilized to actuate the device to dispense the predetermined quantity of batter so that only one valve actuating shaft and a return mechanism must be separately powered.

A further object of this invention is to provide a batter dispensing apparatus employing a three compartment apparatus arranged so batter is fed into the first compartment under pressure and through a valve to the second and third compartments. When a valve from the second compartment is opened to atmosphere, simultaneously the valve between the first and other compartments is closed so that the pressure of the batter is directed to operate a piston, separating the first and third compartments, thereby causing the piston to decrease the cubic area within the third compartment and force batter in the second and third compartments out the discharge spout.

A further feature and advantage of this invention is that the only valving operation which need be controlled to cause the dispensing or metering of the batter is the main metering valve.

A still further object of this invention is to provide a batter dispensing device in which a dispensing tube is powered to move upwardly during the dispensing phase of operation by a batter pressure actuated piston so that the distance between the dispensing tube and the surface upon which the batter is to be deposited increases during the metering.

In the drawings:

FIG. 1 is a fragmentary cross-sectional view of the apparatus of the principal embodiment of the invention showing the apparatus in the start condition of operation.

FIG. 2 is a similar view of FIG. 1 with the apparatus shown in the phase of operation at the beginning of the dispensing of batter.

Figures 3, 4:
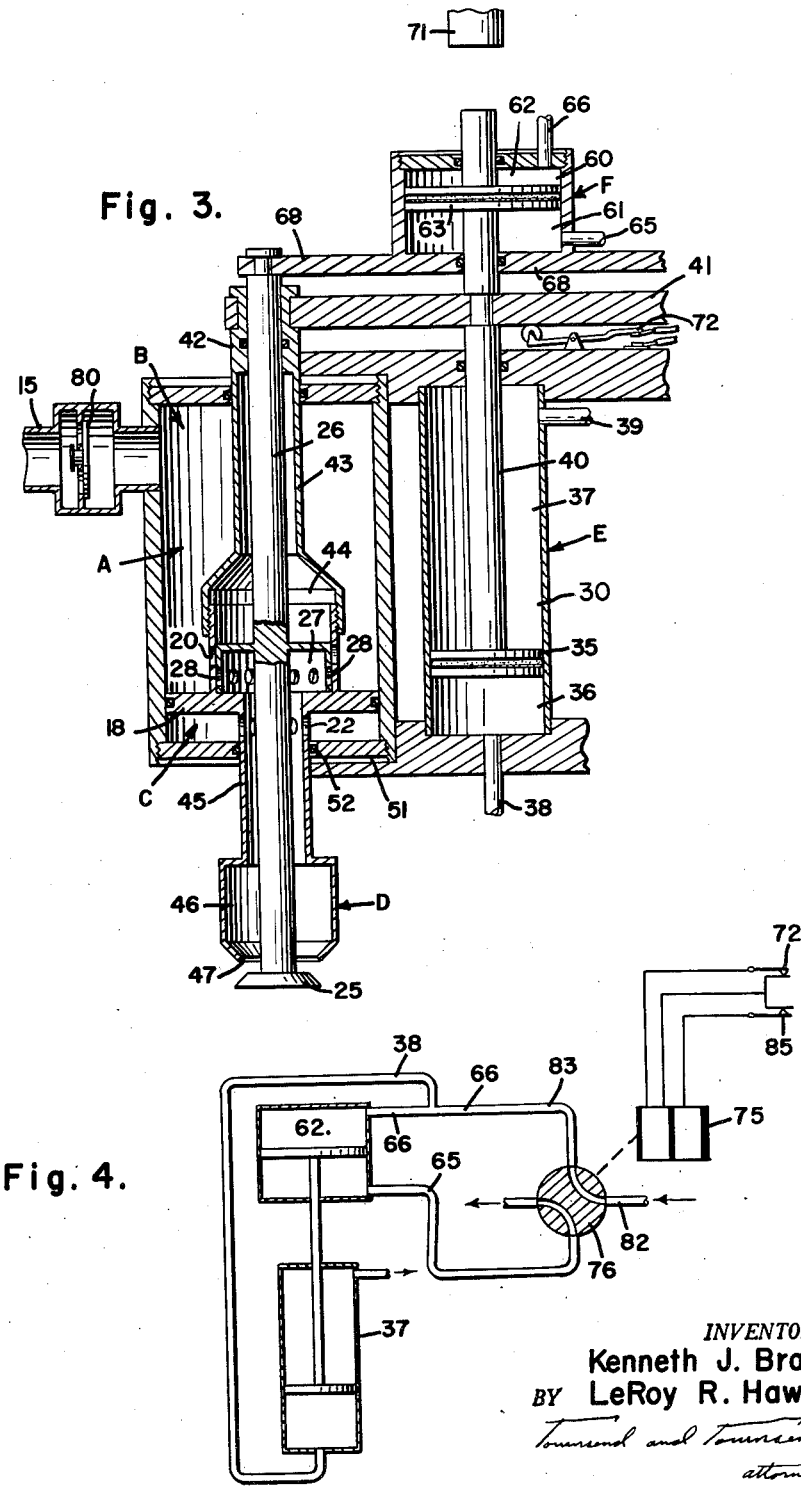
FIG. 3 is a similar view of FIG. 1 showing the apparatus at the end of the batter dispensing phase of operation.
FIG. 4 is a schematic view of the pneumatic circuitry controlling the device of the invention.

Referring now to FIGS. 1, 2, 3 and 4 there is provided a batter dispensing apparatus comprising a cylinder A into which batter is fed under pressure through a conduit 15. A piston 18 divides cylinder A into a pressure compartment B and a storage compartment C. Piston 18 is integral to an axial cylindrical discharge compartment D which is in fluid communication with both compartments B and C.

The discharge compartment is provided with apertures 20 to form the fluid communication link between storage compartment C and the discharge compartment. The wall of the storage compartment is further provided with a plurality of apertures 22 on the opposite side of piston 18 which form a fluid communication link between compartment C and the discharge compartment.

A poppet valve 25 is arranged to open discharge compartment D to atmosphere so as to dispense batter from the compartment. Valve stem 26 of valve head 25 carries a cylinder 27 with a plurality of apertures 28 which are arranged coincident with apertures 20 when valve 25 is closed and which are further arranged so that the wall of cylinder 27 blocks fluid communication through aperture 20 when valve head 25 is open.

The dispensing apparatus is so constructed that upon opening valve head 25, cylinder 27 causes the simultaneous closing of apertures 20 so that the batter under pressure from conduit 15 exerts force against piston 18 equal to the batter pressure.

The batter within compartment C is in fluid communication with compartment D and to atmosphere through valve head 25 when the valve head is in the open position so that the batter pressure within compartment B tends to force the piston in a downward direction thus enlarging the area within compartment B and decreasing the area within compartment C to create the necessary force to forcefully eject the batter in compartment C out through the valve 25.

A return mechanism generally indicated at E is provided to return piston 18 to its normal position after the desired quantity of batter is discharged from the device and a valve actuating mechanism F is provided to control the position of valve head 25 and the openings through the apertures 20 by the prior positioning of valve stem 26 with respect to piston 18 and its associated compartment D.

Piston return mechanism E comprises a return cylinder 30 having a piston 35 dividing the cylinder into two sealed chambers 36 and 37 each supplied by air lines 38 and 39 respectively. Piston 35 is connected to shaft 40 which is mounted by a main frame member 41 to a crown 42 of compartment D which projects upwardly from cylinder A.

Compartment D comprises a long hollow cylindrical tube 43 having a crown 42 mounted on the top thereof. The mid portion of tube 43 is enlarged to provide an intake chamber 44 in which cylinder 27 is reciprocally mounted and on which apertures 20 are provided. The enlarged chamber walls 44 are integrally attached to piston 18 and occupies the area within compartment B.

The lower segment of compartment D comprises a hollow cylindrical tube 45 which extends downwardly through compartment C to a point exterior of cylinder A whereat the bottom portion is enlarged as at 46 and provided with terminal ends 47 which engage to create a seal with valve head 25. Valve stem 26 is reciprocally mounted within the hollow portion of the two tubes 45 and 53 and in spaced relation therewith so as to provide a continuous fluid communication path throughout the entire length of tubes 43 and 45 between the bore of the shafts and the valve stem 26. The cylindrical tube 45 carries apertures 28 which are disposed within compartment C.

The top and bottom walls 51 of cylinder A are sealed to the side wall of the cylinder and are provided with a slidable O-ring seal 52 which allows compartment D to be reciprocally moved with respect to cylinder A without destroying the sealed chamber of compartments B and C.

Valve actuating mechanism F comprises a pneumatic cylinder 60 divided into two compartments 61 and 62 by a piston 63. Piston 63 is integrally mounted on shaft 40 and is provided with air through a conduit 65 which enters chamber 61 and a conduit 66 which enters chamber 62.

The bottom wall of cylinder 60 is formed by a valve actuating plate 68 which is integrally attached to the cylinder so that when air pressure is varied through the conduits 65 and 66 the cylinder and not the piston moves to cause reciprocating movement of valve actuating plate 68. The valve actuating plate in turn is directly connected to the crown or tip portion 69 of valve stem 26.

Downward movement of the piston in chamber D is controlled by a micro-switch 72. Micro-switch 72 is actuated by main frame member 41 when the plate has moved to the desired lowest limit. Switch 72 controls a solenoid 75 which actuates a pneumatic valve 76 which controls return mechanism E and valve actuating mechanism F.

Conduit 15 is provided with a check valve 80 so that the batter passing under pressure from conduit 15 and into chamber B can only flow in the direction toward and into chamber B.

In operation normally valve 76 is arranged to supply air from a conduit 82 to a conduit 83 which communicates directly with conduits 38 and 66 so that air is forced under pressure into chambers 36 and 62. In this condition valve head 25 is in the closed condition and apertures 20 are opened to provide fluid communication between compartment B and compartment D. At the same time the air pressure against piston 35 maintains piston 18 in an intermediate position within cylinder A. Upon actuating a switch 85, solenoid 75 is actuated to cause a valve 76 to shift so that air is directed to chamber 61 through conduit 65 so both the openings from conduits 39 and 66 are opened to atmosphere. By this means cylinder 60 is forced downwardly thus causing valve stems 26 and valve head 25 to open and at the same time cylinder 27 is moved to a position where apertures 20 are closed. Under these conditions the batter pressure in chamber B acts against piston 18 to compress the batter within chamber C to force the batter therein into discharge chamber D and out the terminal ends 47 of the valve.

During this movement the batter is dispensed until main frame member 41 makes contact with micro-switch 72. This contact causes solenoid 75 to shift valve 76 to the normal position whereat air pressure is forced within chamber 36 of the return mechanism E thus causing the air pressure to return piston 18 to its normal upward position. At the same time the air pressure is diverted through line 65 to chamber 61 of the valve actuating mechanism to cause valve head 25 to close. The device in this condition is then ready to repeat the cycle upon the subsequent closing of switch 85.

Stop 71 limits the upward movement of shaft 40 and by adjustment can determine the amount of batter to be dispensed by limiting the amount of batter to be stored within compartment C.

Figure 5:
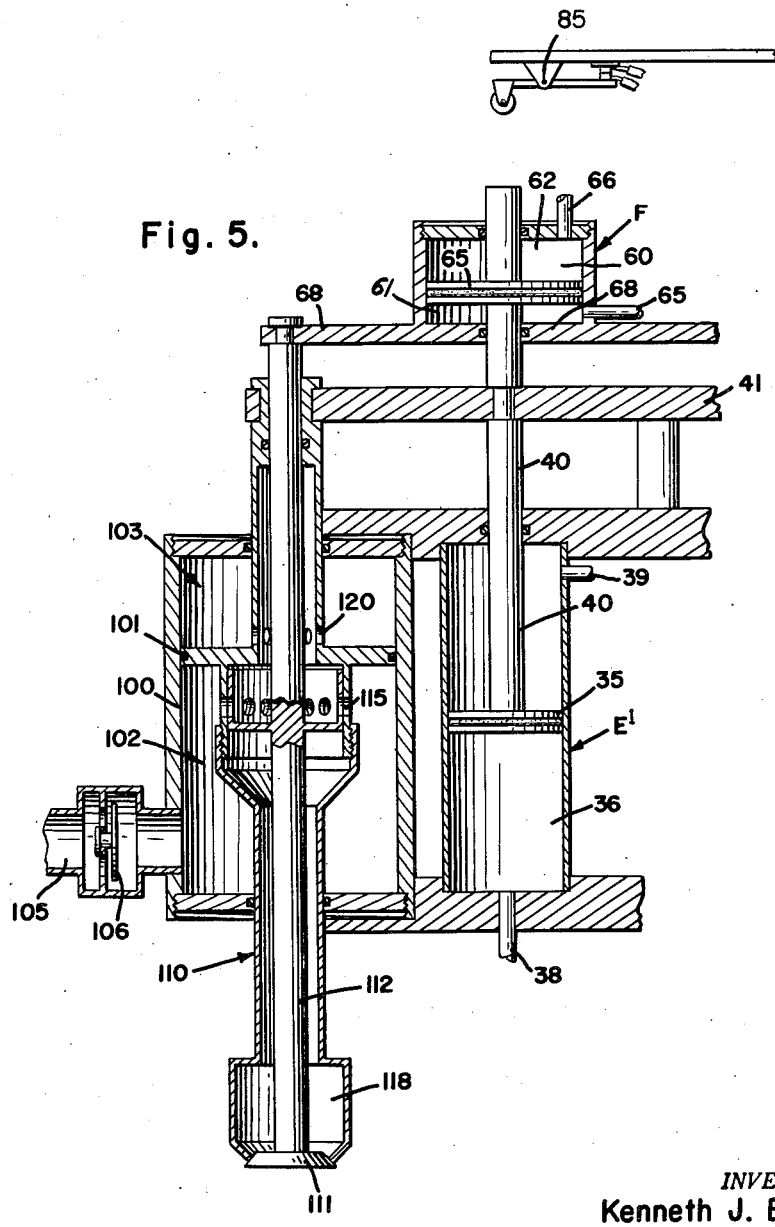
FIG. 5 is a fragmentary cross-section of a modification of the invention in which batter is dispensed from a dispensing head that moves upwardly during dispensing.

Referring now to FIG. 5 another embodiment of the invention is shown which dispenses batter from the discharge valve while the discharge valve is rising upwardly from the point of initial deposit during the discharging phase of operation.

The modification of FIG. 5 comprises a cylinder 100 employing a piston 101 dividing the cylinder into two compartments 102 and 103. Batter under pressure is supplied to compartment 102 via a conduit 105 through a check valve 106. The piston is formed with an elongated hollow cylindrical tube 110 mounted integrally thereof and in axial alignment with cylinder 100 so as to be slidably mounted in sealed relationship with the end walls of the cylinder in substantially the same manner as shown in relation to the embodiments of FIGS. 1 through 4.

A poppet valve 111 is arranged on the lower end of hollow shaft 110 to open and close fluid communication from the tube to atmosphere. The poppet valve employs a stem 112 which operates to open and close fluid communication via apertures 115 from compartment 102 to the compartment 118 of the cylinder within tube 110. Apertures 120 are provided in fluid communication between compartment 103 and compartment 118.

A valve actuating mechanism F, identical to the valve actuating mechanism of the embodiments of FIGS. 1 through 4, is arranged to open and close valve 111.

For the convenience of illustration in FIG. 5 the identical reference numerals are employed where the parts illustrated are identical to the parts illustrated in FIGS. 1 through 4.

A return mechanism $E^1$, substantially identical to the mechanism E in FIGS. 1 through 4, is employed to return the piston to the normal poistion. Mechanism $E^1$ differs only in that the air pressure is applied to the reverse side of piston 35 in order to move piston 101 to the normal or return position.

In operation normally batter under pressure passes from conduit 105 into chamber 102 through apertures 115 into chambers 118 and 103. In order to actuate the device, compartment 61 of the valve actuating mechanism is charged with air so as to cause valve actuating plate 68 to open valve 111 and close apertures 115. The dispensing mechanism from chamber 118 on the end of shaft 110 thence raises upwardly due to the upward movement of piston 101 during the dispensing of batter. When shaft 40 makes contact with a micro-switch 85 the valve is shifted and the air pressure is reversed to charge chamber 62 of the valve actuating mechanism F and to charge compartment 37 of the return mechanism $E^1$. This action causes piston 101 to move downwardly to the normal position and valve 111 to close, and simultaneously open apertures 120.

This embodiment has the advantage of providing the first discharge of batter substantially adjacent the grill or conveyor belt upon which the batter is to be deposited and thence to continue to deposit batter on the upward stroke. Such operation substantially reduces the splash or splatter of the batter.

Although the foregoing invention has been described in some detail by way of illustration and example for purposes of clarity of understanding it is understood that certain changes and modifications may be practiced within the spirit of the invention as limited only by the scope of the appended claims.

What is claimed is:

1. A dispensing device for flowable material comprising: a sealed cylinder; a piston reciprocally mounted in said cylinder and dividing said cylinder into first and second compartments; the dispensing means having a first portion within said cylinder and a second portion external of said cylinder; said first portion of said dispensing means mounted on said piston in fluid communication with said first and second compartments; first valve means operable to open and close fluid communication from said first compartment to said dispensing means; second valve means operable to open fluid communication from said dispensing means to atmosphere; means to deliver flowable material under pressure to said first compartment; and means to actuate synchronously said first and second valves inversely of each other to their respective opened and closed positions.

2. A dispensing device for flowable material comprising: a sealed cylinder; a piston reciprocally mounted in said cylinder and dividing said cylinder into first and second compartments; dispensing means having a first portion within said cylinder and a second portion protruding exteriorly thereof; means to establish fluid communication between said first and second compartments and said dispensing means; first valve means operable to open and close fluid communication between said first compartment and said dispensing means; second valve means operable to open and close fluid communication from the second portion of said dispensing means; means to inversely synchronously open and close said first and second valves; means in fluid communication with said first compartment to supply said first compartment with flowable material under pressure; piston moving means operable to move said piston toward said first compartment; and control means to actuate said piston moving means when said first valve is in the open position and said second valve is in the closed position.

3. A dispensing device for flowable material comprising: a sealed cylinder; a piston reciprocally mounted in said cylinder and dividing said cylinder into first and second compartments; dispensing means having a first portion within said cylinder and integrally connected to said piston and reciprocally movable therewith and having a second portion projecting exteriorly of said cylinder; means to establish fluid communication between said first and second compartments and said dispensing means; first valve means operable to open and close fluid communication between said first compartment and said dispensing means; second valve means operable to open and close fluid communication from the second portion of said dispensing means; means to inversely synchronously open and close said first and second valve; means in fluid communication with said first compartment to supply said first compartment with flowable material under pressure; piston moving means operable to move said piston toward said first compartment; and control means to actuate said piston moving means when said first valve is in the open position and said second valve is in the closed position.

4. A dispensing device in accordance with claim 3 and wherein said cylinder is orientated vertically and said first compartment is disposed above said second compartment and wherein the second portion of said dispensing means depends downwardly from said cylinder.

5. A dispensing device in accordance with claim 3 and wherein said cylinder is orientated vertically and said first compartment is disposed below said second compartment and wherein the second portion of said dispensing means depends downwardly from said cylinder.

6. A batter dispensing device comprising: a sealed cylinder; a piston reciprocally mounted in said cylinder and dividing said cylinder into first and second compartments; a sealed hollow tube having a mid portion within said cylinder and having first and second ends projecting outwardly from the opposite first and second ends of said cylinder; said mid portion of said tube rigidly connected to said piston; a poppet valve within said tube having a valve head to seal the second end of said tube and an axially aligned stem slidably projecting exteriorly of the first end of said tube; first ports communicating said first compartment with the interior of said tube; second ports communicating said second compartment with the interior of said tube; valve control means connected to the valve stem to reciprocally move said poppet valve to open and close the second end of said tube; first port closing means mounted on said valve stem interiorly of said tube positioned to close fluid communication through said first ports when said poppet valve is in the open position and to open the first ports when said poppet valve is in the closed position; conduit means in fluid communication with said first compartment to feed batter under pressure into said first compartment; return means connected to one of said first and second ends of said tube to force said tube to move said piston toward the first end of said cylinder; and control means to actuate said return means when said poppet valve is in the closed position.

7. A device according to claim 6 having a check valve in said conduit means positioned to allow batter to flow toward said cylinder and not in the reverse direction.

8. In a dispensing device for flowable material the combination of conduit means for carrying flowable material under pressure; a cylinder; a reciprocally movable piston dividing said cylinder into first and second chambers; means to establish fluid communication between said conduit means and said first chamber; a hollow member defining a third chamber within said member and having a first portion of said member within said cylinder and a second portion extending exteriorly thereof; first valve means operable to open and close fluid communication between said first and said third chambers; means to continually maintain fluid communication between said second and said third chambers; second valve means mounted on the second portion of said member to open and close fluid communication between said third chamber and atmosphere; first valve control means operable to open and close said first valve; second valve control means operable to open and close said second valve; means to time the relative opening and closing of said first valve means inversely with the opening and closing of said second valve means; and means to force said piston to move toward said first chamber when said first valve is opened and said second valve is closed.

References Cited in the file of this patent
UNITED STATES PATENTS

| | | |
|---|---|---|
| 1,870,188 | Abrams | Aug. 2, 1932 |
| 2,643,866 | Kollsman | June 30, 1953 |
| 2,717,113 | Clark | Sept. 6, 1955 |